United States Patent
Kobayashi et al.

(10) Patent No.: US 6,214,226 B1
(45) Date of Patent: Apr. 10, 2001

(54) HOLLOW FIBER MEMBRANE MODULE, HOLLOW FIBER MEMBRANE MODULE UNIT WHICH UTILIZES THE MODULE, AND PURIFICATION TANK WITH THE MODULE UNIT INSTALLED THEREIN

(75) Inventors: Masumi Kobayashi; Kenji Honjyo; Satoshi Miyashita; Katsuyuki Yanone; Masanori Itakura; Hiroyuki Okazaki, all of Nagoya (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/252,225

(22) Filed: Feb. 18, 1999

(51) Int. Cl.[7] ................................................. B01D 63/02
(52) U.S. Cl. .............................. 210/500.23; 210/321.8; 210/232; 210/321.89; 264/DIG. 48
(58) Field of Search ........................ 210/321.78, 321.79, 210/321.8, 321.88, 321.89, 499, 500.23, 232, 231, 321.75, 456; 264/DIG. 48

(56) References Cited

U.S. PATENT DOCUMENTS

| | | | |
|---|---|---|---|
| 4,349,440 | * | 9/1982 | Esmond ............................ 210/321.6 |
| 4,791,054 | * | 12/1988 | Hamada et al. ................... 210/321.8 |
| 5,248,424 | * | 9/1993 | Cote et al. ........................... 210/636 |
| 5,480,553 | * | 1/1996 | Yamamori et al. .................. 210/650 |
| 5,593,580 | * | 1/1997 | Kopf ..................................... 210/231 |
| 5,783,083 | * | 7/1998 | Henshaw et al. .................... 210/636 |
| 5,922,201 | * | 7/1999 | Yamamori et al. ............. 210/321.79 |

FOREIGN PATENT DOCUMENTS

| | | |
|---|---|---|
| 0 598 909 | 6/1994 | (EP) . |
| 3-93532 | 4/1991 | (JP) . |
| 5-220357 | 8/1993 | (JP) . |
| 5-261253 | 10/1993 | (JP) . |
| 5-269357 | 10/1993 | (JP) . |
| 6-340 | 1/1994 | (JP) . |
| 6-342 | 1/1994 | (JP) . |
| 7-47238 | 2/1995 | (JP) . |
| 7-96149 | 4/1995 | (JP) . |
| 7-136470 | 5/1995 | (JP) . |
| 7-178320 | 7/1995 | (JP) . |
| 8-19730 | 1/1996 | (JP) . |
| 8-24591 | 1/1996 | (JP) . |
| 8-215548 | 8/1996 | (JP) . |
| 9-24252 | 1/1997 | (JP) . |
| 9-47762 | 2/1997 | (JP) . |
| 9-215980 | 8/1997 | (JP) . |
| WO 97/06880 | 2/1997 | (WO) . |

\* cited by examiner

Primary Examiner—Ana Fortuna
(74) Attorney, Agent, or Firm—Oblon, Spivak, McClelland, Maier & Neustadt, P.C.

(57) ABSTRACT

An object is to provide a highly integrated hollow fiber membrane module and hollow fiber membrane module unit as filtration processing devices which are appropriate for miniaturization, and to also provide a purification tank with a hollow fiber membrane module unit installed therein. To achieve this there is provided a hollow fiber membrane module in which at least one end of a hollow fiber membrane with hollow fibers deployed in a plane is fixed with a fixing resin to a collector pipe in a fluid tight manner, constructed such that an open ended tip of the hollow fiber membrane is inserted into an aperture provided in the collector pipe, and in this condition, fixing resin is filled into the aperture and hardened, thereby securing the open ended hollow fiber membrane to the collector pipe. Also provided is a hollow fiber membrane module unit wherein a plurality of the hollow fiber membrane modules are positioned proximately, and a purification tank with the hollow fiber membrane module units installed therein.

20 Claims, 7 Drawing Sheets

HOLLOW FIBER MEMBRANE MODULE, HOLLOW FIBER MEMBRANE MODULE UNIT WHICH UTILIZES THE MODULE, AND PURIFICATION TANK WITH THE MODULE UNIT INSTALLED THEREIN

BACKGROUND OF INVENTION

1. Field of the Invention

The present invention relates to a hollow fiber membrane module used for filtering liquids, and in particular relates to a hollow fiber membrane module, a hollow fiber membrane module unit which utilizes the hollow fiber membrane module, and a purification tank with a hollow fiber membrane module unit installed therein, which are suitable for filtering liquids with high levels of pollutants (especially organic pollutants).

This application is based on Japanese Patent Application No. Hei 8-221567 and Hei 9-217877, the contents of which are incorporated herein by reference.

2. Background Art

Hollow fiber membrane modules have found many applications including the manufacture of sterile water, drinking water and ultra-pure water, and the purification of air, but in recent years various investigations have been conducted into the use of hollow fiber membrane modules for processing highly polluted water, including applications such as the secondary and tertiary processing in sewage treatment plants, solid-liquid separation in purification tanks, solid-liquid separation of suspended solids (ss) from industrial waste water, direct filtration of river water in water purification plants, filtration of tap water for industrial use, and filtration of pool water.

Examples of the use of hollow fiber membrane modules for processing highly polluted water include the hollow fiber membrane modules and hollow fiber membrane module units formed by layering hollow fiber membrane modules, disclosed in Japanese Patent Application, First Publication Nos. Hei 5-261253, Hei 6-340, and Hei 6-342.

Figure 9:
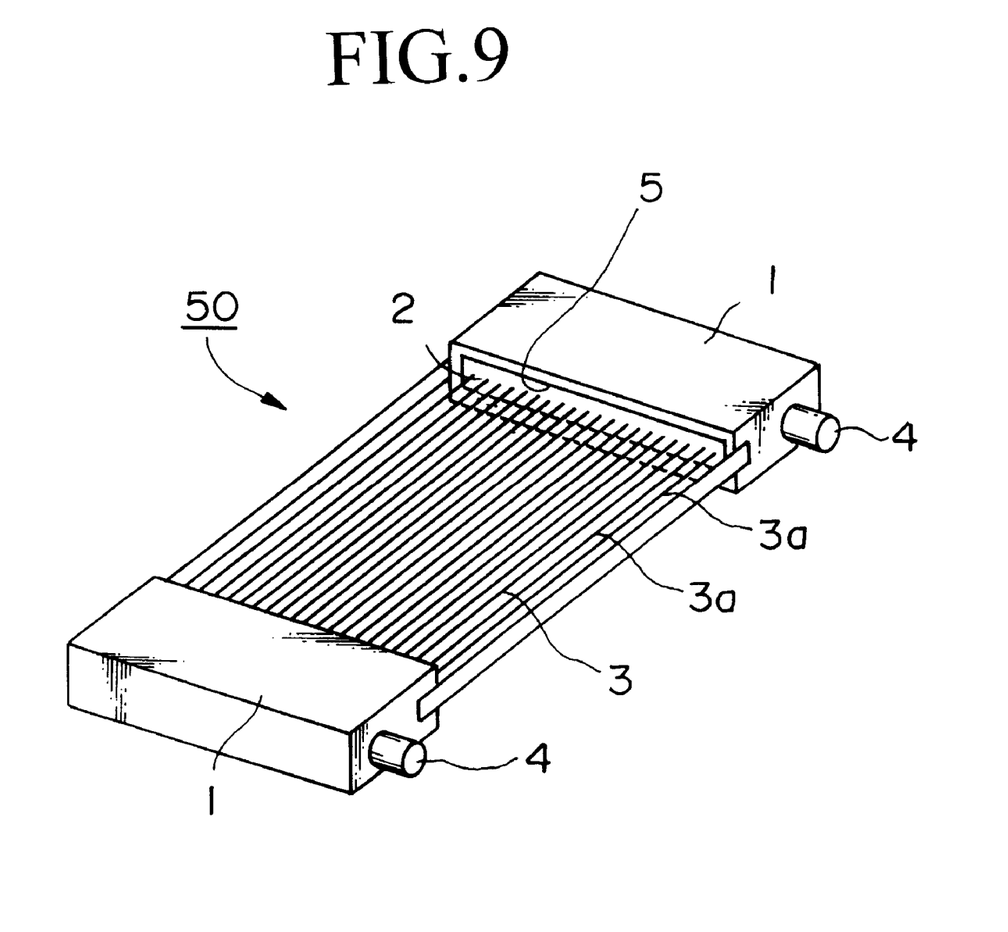
FIG. 9 is a perspective view showing an example of a conventional hollow fiber membrane module.

FIG. 9 shows an example of a conventional hollow fiber membrane module, wherein a hollow fiber membrane module 50 is constructed of a hollow fiber membrane 3 comprising a plurality of hollow fibers 3a arranged in parallel, and a pair of facing collector pipes 1 fitted to the two extremities of the hollow fiber membrane 3.

The collector pipes 1 have an internal passage, one end of which is closed, while the other end is fitted with a pipe 4 which connects to a suction pump, which is not shown in the figure. Moreover, an aperture 5 is located on the outer wall, and along the length of, each collector pipe 1. Following insertion of the tips of the hollow fiber membrane 3 into the apertures 5, a fixing resin 2 is filled therein, which hardens and closes the apertures, thus fixing and supporting the hollow fiber membrane 3 firmly in place. In this instance, the tips of the hollow fiber membrane 3 are the extremities at either end of the hollow fibers 3a. The two ends of each hollow fiber 3a thus open out into the internal passage inside the collector pipe 1.

To use the hollow fiber membrane module 50 outlined above for suction filtration, the hollow fiber membrane module 50 is positioned inside a tank containing the liquid to be processed, and the pipes 4 are connected to a suction pump.

Activating the suction pump causes the inside of the hollow fibers 3a to develop a negative pressure, thus drawing the liquid to be processed to the hollow fibers 3a, where it permeates through the hollow fibers 3a and is filtered, and the filtrate then passes along the hollow fibers 3a into the internal passage insides the collector pipes 1, through the pipes 4, and is then sucked through the suction pump and discharged.

A plurality of hollow fiber membrane modules 50 with the construction of this type can be arranged inside a tank containing the liquid to be processed, thus forming a hollow fiber membrane module unit. By arranging a plurality of hollow fiber membrane modules 50 inside the tank, the total membrane surface area can be increased, enabling an improvement in processing ability, and in the case of cleaning via methods such as air scrubbing, water and air can move easily between the hollow fiber membranes 3, enabling efficient cleaning of the membrane surface.

However, with the manufacture of this type of hollow fiber membrane module 50, in order to fix the hollow fibers 3a to the collector pipes 1 and then open both ends of the fibers, the two ends of the hollow fibers 3a must first be fixed in place using the fixing resin 2, and the ends of the hollow fiber membrane 3 then opened by inserting a special cutting tool inside the collector pipe 1 and cutting the fixing resin and the ends of the hollow fiber membrane 3. Consequently, it has been impossible to obtain hollow fiber membrane modules with long length collector pipes 1. Furthermore, collector pipes 1 with large outside diameters have also been necessary, which have resulted in a decrease in the pressure tightness of the hollow fiber membrane module 50, and moreover in those instances where a hollow fiber membrane module unit is assembled by layering a plurality of hollow fiber membrane modules 50, the layering ratio per unit volume within the hollow fiber membrane module unit also decreases.

In recent years because the installation of apparatus in purification tanks has fallen greatly in price and the construction period can be shortened, purification tanks made of FRP are becoming widespread.

Figure 6:
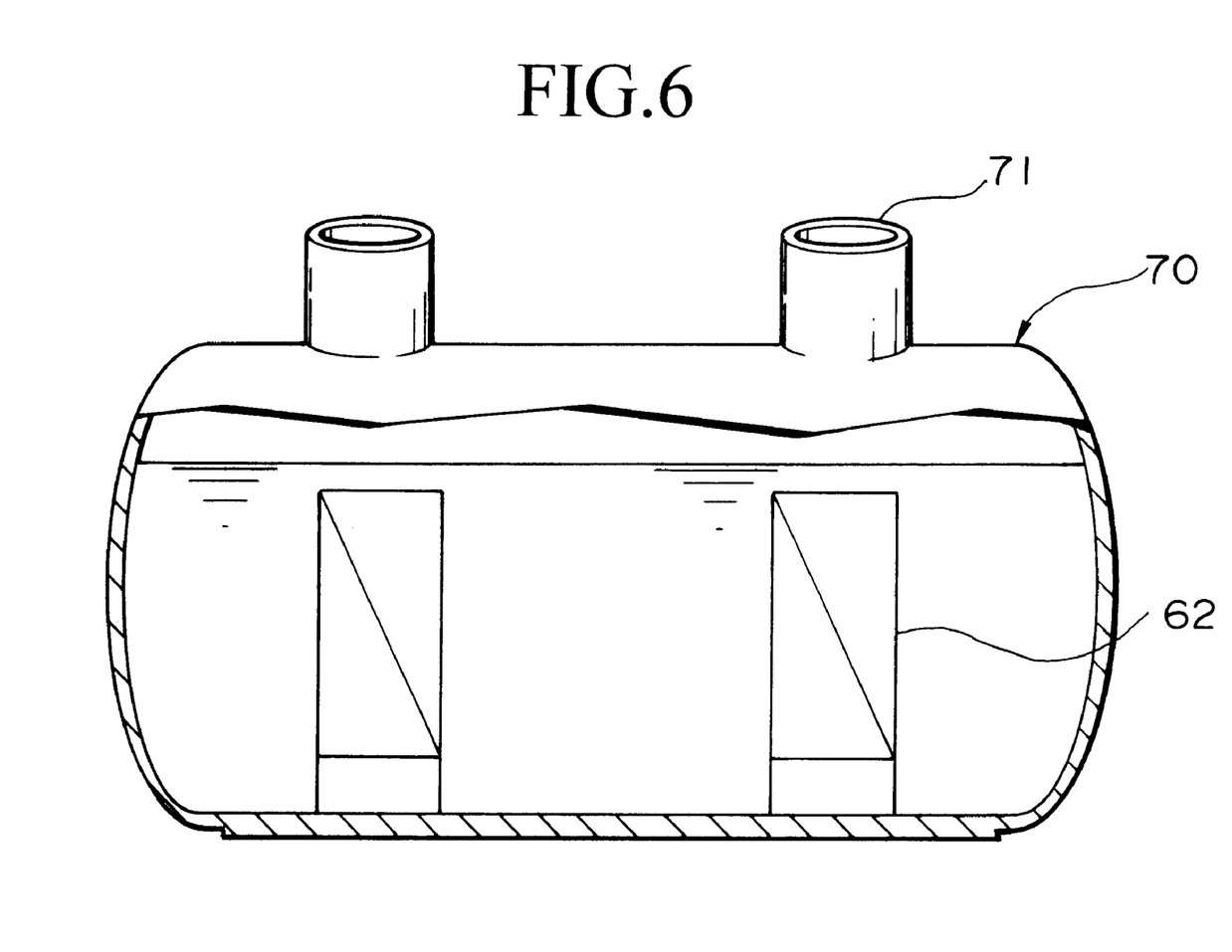
FIG. 6 is a schematic view showing a method for positioning a hollow fiber membrane module unit of the present invention inside a purification tank.

FIG. 6 shows an example of a purification tank made of FRP, with numeral 70 denoting the purification tank. The purification tank 70 is a cylinder made of FRP, the inside of which provides an effective depth of greater than 1.6 m which can be filled with the water to be processed. The purification tank 70 is buried in the ground with a cylindrical manhole 71 provided on the upper surface of the tank, and the top edge of the manhole opened so that the open portion sits above ground level. The outside diameter of the manhole 71 should be at least 600 mm.

With the spread of purification tanks made of FRP, it might be expected that the use of hollow fiber membrane module units like those described above, which display excellent filtration processing capabilities, as the membrane processing filtration devices inside purification tanks of FRP would be extremely beneficial, but because in the purification tank 70 described above the manhole 71 is the only opening available for the installation or exchange of filtration processing devices, purification of drain water using the hollow fiber membrane module unit described above would require a restriction on the size of the hollow fiber membrane module unit, in order to allow for installation inside the tank. Furthermore, even allowing for the size restriction, a filtration processing device would have to filter at least for a tank for five family (1 $m^3$/day), and with conventional hollow fiber membrane module units there would be difficulties with both size and the layering ratio, meaning that installation into purification tanks where there are size restrictions, as in the case of tanks made of FRP, has been problematic.

SUMMARY OF THE INVENTION

Consequently, it is an object of the present invention to provide a highly integrated and very pressure tight hollow fiber membrane module and hollow fiber membrane module unit as filtration processing devices, which can be used even in cases where size restrictions exist, as in the case of purification tanks made of FRP, and to also provide a purification tank with a hollow fiber membrane module unit installed therein.

In order to address the problems outlined above, then with the invention, with a hollow fiber membrane module in which at least one end of a hollow fiber membrane is fixed with a fixing resin to a collector pipe in a fluid tight manner, the construction is such that an open ended tip of the hollow fiber membrane is inserted into an aperture provided in the collector pipe, and in this condition, fixing resin is filled into the aperture without blocking openings at the tip of the hollow fiber membrane and allowed to harden, thereby securing the open ended hollow fiber membrane to the collector pipe.

With the hollow fiber membrane module according to the present invention, a weir is provided at a peripheral portion of the aperture of the collector pipe.

With the hollow fiber membrane module according to the present invention, for the collector pipe, one with an outside diameter of 5~30 mm and a length of 30~2000 mm is used.

With the hollow fiber membrane module according to the present invention, for the fixing resin, one with an initial viscosity of 150~450 cPs is used.

With the hollow fiber membrane module according to the present invention, for the fixing resin, polyurethane resin is used.

With the hollow fiber membrane module according to the present invention, for the hollow fiber membrane, knitted fabric of hollow fibers is used.

With the hollow fiber membrane module according to the present invention, a membrane length of the hollow fiber membrane is in a range of 100~2000 mm.

With the hollow fiber membrane module unit according to the present invention, the construction is such that a plurality of the hollow fiber membrane modules according to the present invention are positioned proximately and integrated together by connecting the collector pipe of each module to a collector header, such that filtered liquid inside a hollow fiber membrane passes through an internal passage inside the collector pipe and drains into the collector header.

With the hollow fiber membrane module unit according to the present invention, the construction is such that a plurality of the hollow fiber membrane modules according to the present invention are positioned proximately and integrated together by connecting the collector pipe of each module to a collector header and by means of a support column and a shield plate, such that filtered liquid inside a hollow fiber membrane passes through an internal passage inside the collector pipe and drains into the collector header.

With the purification tank according to the present invention, the construction is such that a hollow fiber membrane module unit according to the present invention is disposed thereinside, the hollow fiber membrane module unit being disposed inside the purification tank such that the collector pipes of the hollow fiber membrane modules and the membrane surface of the hollow fiber membranes are vertical in relation to the water surface, and the size of the hollow fiber membrane module unit is specified by a length (A) of the unit along the direction of the hollow fiber membrane module layering being within a range 20~500 mm, a length (B) of the unit in a direction along the length of the hollow fibers of the hollow fiber membrane modules being within a range 100~500 mm, and a length (C) of the unit in a direction along the length of the collector pipes of the hollow fiber membrane modules being within a range 100~1500 mm.

With the purification tank according to the present invention, the construction is such that a hollow fiber membrane module unit according to the present invention is disposed thereinside, the hollow fiber membrane module unit being disposed inside the purification tank such that the collector pipes of the hollow fiber membrane modules lie horizontally, and the membrane surface of the hollow fibers are vertical in relation to the water surface, and the size of the disposed hollow fiber membrane module unit is specified by a length (A) of the unit along the direction of the hollow fiber membrane module layering being within a range 20~500 mm, a length (B) of the unit in a direction along the length of the collector pipes of the hollow fiber membrane modules being within a range 100~500 mm, and a length (C) of the unit in a direction along the length of the hollow fibers of the hollow fiber membrane modules being within a range 100~1500 mm.

With the purification tank according to the present invention, a diffuser tube is secured integral with the hollow fiber membrane module unit disposed inside the tank.

The hollow fiber membrane module of the present invention enables a reduction in diameter of the collector pipes and displays excellent pressure tightness. Consequently, the hollow fiber membrane module unit of the present invention, in which a plurality of modules are layered, also displays excellent pressure tightness, has a high degree of integration, and displays excellent filtration processing capabilities, and moreover is able to be miniaturized and positioned inside a purification tank made of FRP.

Furthermore, with a purification tank of the present invention, the hollow fiber membrane module unit is designed to be of a size capable of being inserted and removed through the manhole of the tank and also have a high degree of integration, and so the purification tank displays good filtration processing capabilities and can be used very effectively in processing drain water. Particularly in the case of small scale purification tanks or processing devices of FRP, the maintenance and attachment of the hollow fiber membrane module unit can all be performed via the manhole, meaning the unit can be used very effectively in the filtration processing of highly polluted water.

DESCRIPTION OF THE PREFERRED EMBODIMENTS

The present invention is explained in detail below with reference to the appended drawings.

Figure 1:
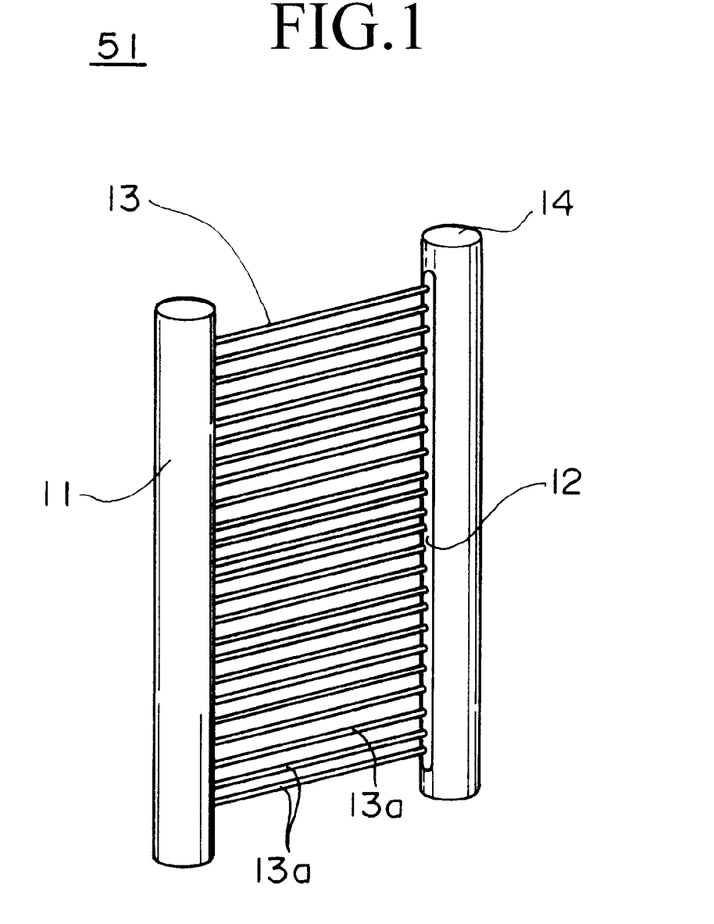
FIG. 1 is a perspective view showing an example of a hollow fiber membrane module of the present invention.
Figure 2:
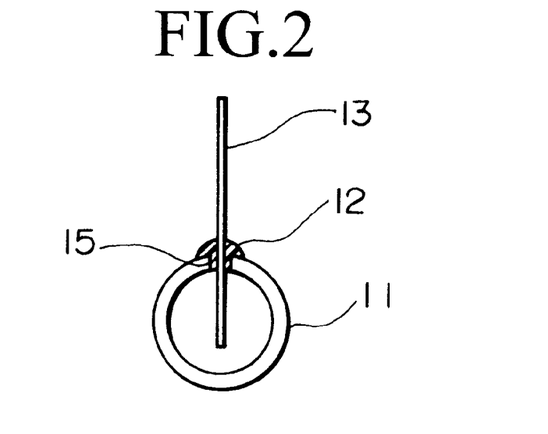
FIG. 2 and FIG. 3 are both cross-sectional views showing sample constructions of a collector pipe of a hollow fiber membrane module of the present invention.
Figure 3:
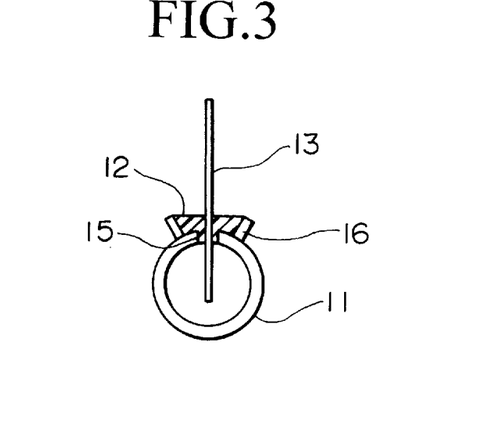

FIG. 1 shows an example of a hollow fiber membrane module of the present invention. FIGS. 2 and 3 both show cross-sectional views of the construction of the collector pipe portion of a hollow fiber membrane module of the present invention. A hollow fiber membrane module 51 is constructed of collector pipes 11, a fixing resin 12, and a hollow fiber membrane 13.

The aforementioned collector pipe 11 is a cylinder with an internal passage inside and an open pipe 14 provided at least one end of the cylinder. Furthermore, a slit shaped aperture 15 is located along the length of the outside wall of the collector pipe 11.

The collector pipe 11 can be made of any material which displays adequate mechanical strength and durability, and suitable materials include polycarbonates, polysulfones, polyolefins, polyvinyl chloride, acrylic resins, ABS resins and modified PPE resins, but the use of hydrocarbon based resins is desirable, as they can be incinerated following use and will undergo complete combustion without releasing toxic gases.

In order to increase the degree of integration, provide the strength required to allow suction by a vacuum pump, ensure low resistance to fluid flow through the internal passage of the collector pipe 11, and avoid difficulties in processing, the outside diameter of the collector pipe 11 should preferably be in the range 5~30 mm, and the length in the range 30~2000 mm. Furthermore, there are no particular restrictions on the thickness of the collector pipe provided the above requirements are met, but thickness of 1~5 mm are preferable.

Furthermore, the collector pipes 11 shown in the figure are cylindrical, but the invention is not limited to this shape, and for example pipes with a square shaped cross-section could also be used.

Following insertion of the open ended tip of the hollow fiber membrane 13 into the aperture 15 located in the collector pipe 11, the hollow fiber membrane 13 is fixed and supported firmly in place by pouring a fixing resin 12 into the aperture 15, without blocking the openings at the tip of the hollow fiber membrane 13, and then hardening the resin. The aperture 15 should preferably be of a width which allows the hollow fiber membrane 13 to be inserted from the outside of the aperture, and will then hold the hollow fiber membrane 13 with sufficient crimping force that the hollow fiber membrane 13 will not pull out, and although this width will vary depending on the outside diameter of the hollow fibers 13a, values in the range 0.3~5 mm are preferable. Widths within this range enable each of the hollow fibers 13a which constitute the hollow fiber membrane 13 to be arranged orderly and easily to one line. If the hollow fiber membrane is formed disorderly with the hollow fibers 13a not lining up, then adhesion of sludge can cause a plurality of hollow fibers 13a to cohere together into a single mass, causing a decrease in the effective surface area of the separation membrane and a subsequent lowering in the separation properties. In those instances where the width of the aperture 15 is narrow and insertion of the hollow fiber membrane 13 is difficult, a device to widen the aperture during insertion of the membrane can be used.

The collector pipe 11 shown in FIG. 3 has a weir 16 formed around the perimeter of the aperture 15 of the collector pipe 11 described above. The collector pipe 11 used can be of this type of construction, with a weir 16. The weir 16 is provided so that when the fixing resin 12 is poured into the aperture 15 and hardened, the resin 12 is less likely to flow out over the external surface of the collector pipe 11.

The fixing resin 12 which is used to fill the aperture 15 binds and fixes each of the hollow fibers 13a into the aperture 15 while retaining the open ended nature of the tips of the fibers, and also closes off the internal passage of the collector pipe 11 making it fluid tight from the outside.

Examples of suitable fixing resins 12 include epoxy resins, unsaturated polyester resins, polyurethane resins, silicone based fillers and various hot melt resins. Of these, polyurethane resin is particularly suitable as the fixing resin 12 as it contracts little during hardening and furthermore the additives incorporated in the polyurethane resin are not prone to dissolving in the filtrate.

Furthermore, it is preferable to use a fixing resin 12 which has an initial viscosity of 150~450 cPs. If the initial viscosity of the fixing resin 12 is less than 150 cPs then the likelihood increases of the fixing resin 12 leaking from the aperture 15 into the inside of the collector pipe 11 during the pouring of the resin 12 into the aperture 15, whereas if the initial viscosity exceeds 450 cPs the impregnation of the fixing resin 12 into the hollow fiber membrane 13 is insufficient, and the likelihood of leaks increases. The viscosity of the fixing resin 12 can be adjusted to ensure a value within the aforementioned range, by controlling factors such as the reactivity for thermosetting resins, and factors such as temperature for thermoplastic resins.

Furthermore, it is even more desirable if ten minutes after application at the aperture 15 the viscosity of the fixing resin 12 increases to a value in the range 700~1300 cPs.

A variety of materials can be used as the hollow fiber membrane 13, including various materials based on cellulose, polyolefins, polyvinyl alcohol, polymethyl methacrylate and polysulfones. Of these, materials based on polyethylene and polypropylene, which are highly ductile, are particularly suitable.

Furthermore, although there are no particular restrictions on the form of the hollow fibers, hollow fibers 13a of outside diameter 20~2000 μm, pore diameter of 0.01~1 μm and porosity of 20~90%, and hollow fiber membranes 13 of membrane thickness of 5~300 μm are preferable.

The hollow fibers can be arranged when the hollow fiber membrane 13 is inserted into the aperture 15, but by using a single piece of knitted fabric where the hollow fibers act as the weft, or alternatively using a layered material comprising a plurality of layers of such knitted fabric, the fixing of the hollow fiber membrane 13 to the collector pipe 11 can be carried out quite easily and a hollow fiber membrane module 51 with the desired membrane surface area can be constructed easily and efficiently.

Furthermore, a single hollow fiber membrane sheet where a portion of the membrane wall of a hollow fiber membrane 13 is adhered to a side surface of an adjacent hollow fiber membrane, or alternatively a layered material comprising layers of a plurality of such hollow fiber membrane sheets can also be used.

What is referred to above as a layered material, includes a piece of knitted fabric which is folded over at a suitable length and layered without cutting. The number of layers of knitted fabric will vary depending on the thickness of the knitted fabric, namely the outside diameter of the hollow fibers and the number of strand in the hollow fiber membrane during the production of the knitted fabric, but typically about 5 layers is preferable.

Furthermore, the length of the hollow fiber membrane 13 should preferably be in the range 100~2000 mm, with values between 200~1000 mm being even more desirable. Hollow fiber membrane lengths within this range will accommodate the compacting of a hollow fiber membrane module unit produced by layering hollow fiber membrane modules 51, and generate a product with sufficient filtration processing capability.

There are no particular restrictions on the shape of the hollow fiber membrane 13, provided the hollow fiber membranes 13 do not cohere together into a mass and can be easily fixed to the collector pipes 11.

The method for fixing the hollow fiber membrane 13 to the collector pipe 11 involves first pre-cutting and opening up the tip of the hollow fiber membrane 13 which is to be inserted into the aperture 15 of the collector pipe 11. In the case where the tips of both ends of the hollow fiber membrane 13 are to be inserted into a collector pipe 11, both tips are cut and opened up. This method allows a reduction in the number of steps required in the production of a hollow fiber membrane module in comparison with conventional methods.

Next at least one tip of the hollow fiber membrane 13 is inserted into the aperture 15 in the collector pipe 11 so that the openings at the tips of the fibers are located inside the internal passage of the collector pipe 11, and then as is shown in FIGS. 2 and 3, liquid fixing resin 12 is poured from outside the collector pipe 11 into the aperture 15 and then hardened, thus fixing the hollow fiber membrane 13 in place. During this process, if as is shown in FIG. 3, the collector pipe 11 is fitted with a weir 16, then the fixing resin 12 can be stored inside the weir 16 and hardened. With this type of configuration, when the fixing resin 12 is poured into the aperture 15, it will be unlikely to flow out over the external surface of the collector pipe 11, and will be more easily impregnated into the surface of the hollow fiber membrane 13.

Following the insertion of the pre-cut and opened tip of the hollow fiber membrane 13 into the aperture 15 of the collector pipe 11, the portion of the hollow fiber membrane 13 at the aperture 15 is fixed in place with the fixing resin 12, and so the requirement in conventional methods of cutting the resin fixed portion of the tip of the hollow fiber membrane 13 from inside the collector pipe 11 disappears. Consequently, the diameter of the collector pipe 11 can be reduced, enabling an increase in the pressure tightness of the hollow fiber membrane module 51. Furthermore, it also enables the collector pipe 11 to be lengthened.

Because narrowing the diameter and increasing the length of the collector pipe 11 makes it possible to increase the integration in those instances where a plurality of hollow fiber membrane modules 51 are layered to generate a hollow fiber membrane module unit, production of a compact hollow fiber membrane module unit with good pressure tightness and filtration capabilities properties becomes possible.

Figure 4:
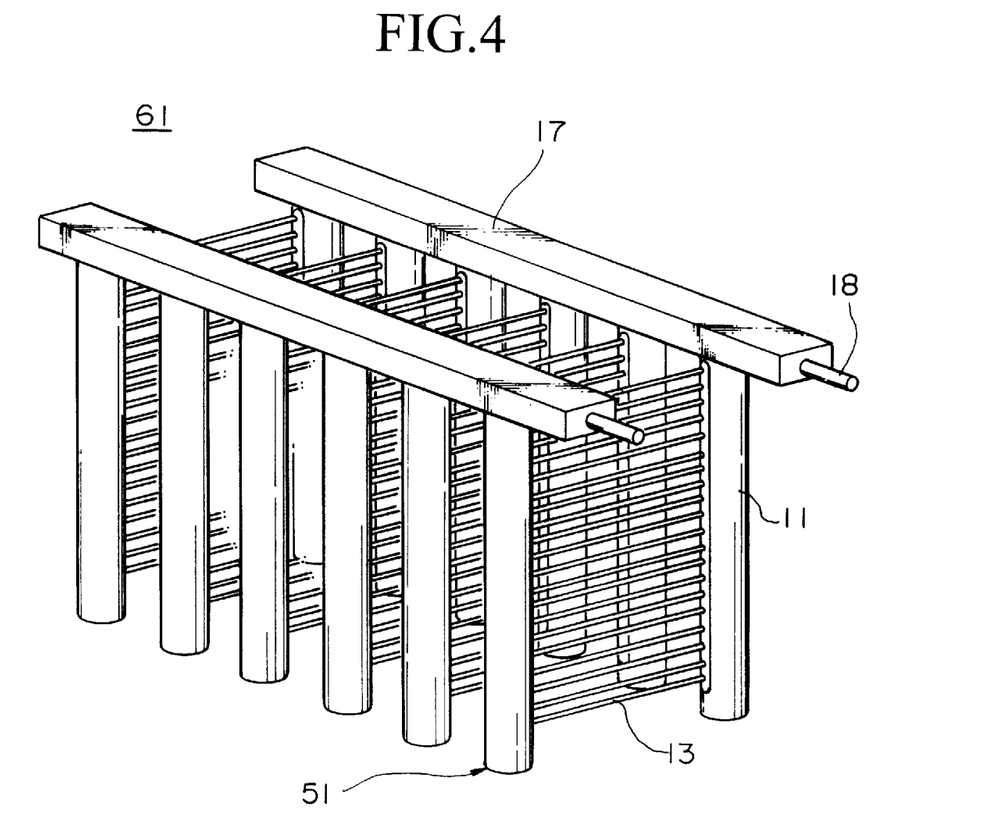
FIG. 4 is a cross-sectional view showing an example of a hollow fiber membrane module unit of the present invention.

FIG. 4 shows an example of a hollow fiber membrane module unit of the present invention. With the hollow fiber membrane module unit 61, a plurality of the hollow fiber membrane modules 51 described above are positioned proximately and then integrated together by connecting the collector pipe 11 of each module to a collector header 17.

Figure 5:
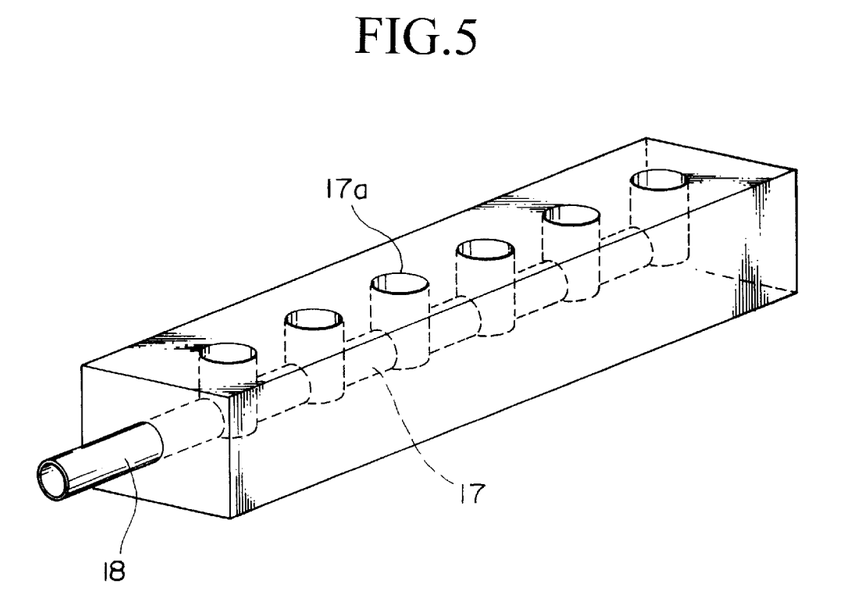
FIG. 5 is perspective view showing an example of a collector header of a hollow fiber membrane module unit of the present invention.

FIG. 5 shows an example of a collector header 17 of the hollow fiber membrane module unit 61 described above. The collector header 17 is a tube which has a plurality of connecting apertures 17a for interconnecting with the pipes 14 of the collector pipes 11 of the plurality of hollow fiber membrane modules 51, and the inside of which is equipped with a guide tube through which the filtrate flows. The interconnecting apertures 17a connect with a plurality of hollow fiber membrane modules 51 integrating and holding the modules together. Furthermore, the guide tube connects through to the external surface of the collector header 17 and acts as the suction port 18 to which a suction pump is connected.

A manifold type shaped collector header which enables the simple connection and fixing of a plurality of hollow fiber membrane modules 51 is desirable, but there are no particular restrictions on the shape provided the configuration enables the removal of the filtrate from the hollow fiber membrane modules 51.

Furthermore, with the hollow fiber membrane module unit 61 shown in FIG. 4 the tips of one end of the collector pipes 11 of each hollow fiber membrane module 51 are held together by the collector header 17, but a construction where both ends of the collector pipes 11 are held by collector headers 17 is also possible. With such a construction, a suction port 18 must be provided at least on the collector header 17 connected to the pipes 14 of the collector pipes 11.

As described above, the hollow fiber membrane module unit 61 of the present invention comprises a plurality of the hollow fiber membrane modules 51 described above positioned proximately and then integrated and held together by a collector header 17, and so it is appropriate for miniaturization and displays good pressure tightness and filtration processing capabilities, while also allowing simple exchange of the hollow fiber membrane modules, and can thus be used very effectively in purification tanks.

FIG. 6 shows an example of a purification tank of the present invention. The purification tank 70 is a small scale combination purification tank with the main body of the tank being made of FRP and the inside of the tank holding water for processing of at least 1.6 m in depth. Typically, in order to enable the purification tank 70 to be buried in the ground, a cylindrical manhole 71 is provided as a connecting passage to the ground surface. Furthermore, a hollow fiber membrane module unit 62 is positioned inside the tank at a position below the manhole 71 to act as the membrane separation device. The hollow fiber membrane module unit 62 can be located in a single stage as shown in the figure, or alternatively a plurality of units can be layered vertically on top of one another.

In those cases where a hollow fiber membrane module unit 62 is located in the purification tank 70, following positioning inside the purification tank 70, maintenance of the internal device is only possible via the manhole 71. Consequently, the size of a hollow fiber membrane module unit 62 to be installed inside a tank is adjusted to correspond with the amount of processing desired and the space available for locating the unit.

Generally, the smallest manhole 71 would be of outside diameter 600 mm. Consequently, the size of the hollow fiber membrane module unit 62 must be sufficiently small to allow insertion through a manhole 71 of outside diameter 600 mm. The hollow fiber membrane module units 62 of the present invention can be constructed at a size sufficiently small to enable positioning through a manhole 71 of minimum outside diameter of 600 mm.

Figure 7:
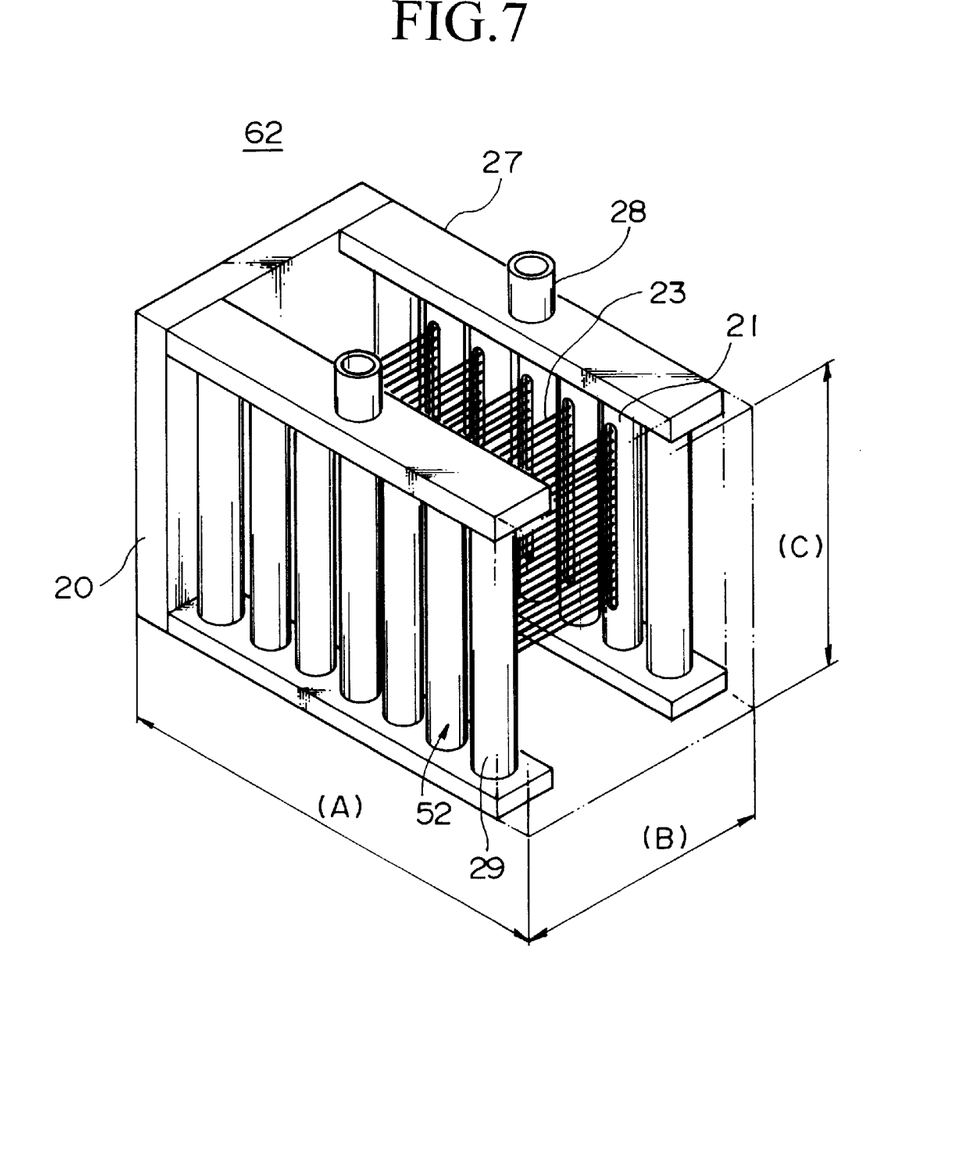
FIG. 7 and FIG. 8 are both perspective views showing examples of hollow fiber membrane module units of the present invention.

FIG. 7 shows an example of a hollow fiber membrane module unit to be positioned inside the aforementioned purification tank. The hollow fiber membrane module unit 62 has the same structural parts as the hollow fiber membrane module unit 61 of the present invention described above, but in order to make the unit more compact to fit the purification tank 70, it is preferable that the unit incorporates support columns 29 and shield plates 20.

A plurality of hollow fiber membrane modules 52 are arranged in the hollow fiber membrane module unit 62, which is a rectangular parallelepiped, the shape of which is maintained by the collector header 27, the support columns 29 and the shield plates 20, and the unit is positioned inside a purification tank so that the collector pipes 21 of the hollow fiber membrane modules 52 and the membrane surfaces of the hollow fiber membranes 23 lie vertically.

The rectangular parallelepiped shaped hollow fiber membrane module unit 62 is constructed so that a length (A) of the unit along the direction of the hollow fiber membrane module 52 layering is within a range 20~500 mm, a length (B) of the unit in a direction along the length of the hollow fiber membrane 23 of the hollow fiber membrane modules 52 is within a range 100~500 mm, and a height (C) of the unit in a direction along the length of the collector pipes 21 of the hollow fiber membrane modules 52 is within a range 100~1500 mm.

The length (A) of the unit will be determined by the outside diameter of the collector pipes 21, the distance between adjacent collector pipes, the outside diameter of the support columns 29, the distance between the support column 29 and the adjacent collector pipe 21, the length of the collector header 27, and the thickness of the shield plates 20. The length (B) of the unit will be determined by the distance between the two opposing collector pipes 21 of the hollow fiber membrane module unit 62, that is, the length of the hollow fiber membrane 23. The height (C) of the unit will be determined by the lengths of the collector pipes 21 and the support columns 29, and the outside dimension of the collector header 27. The overall size of the hollow fiber membrane module unit 62 will be determined by adjusting the three inter-related dimensions appropriately.

The unit height (C) and unit length (A) of the hollow fiber membrane module unit 62 will be related to the size of the collector pipes 21, but as described above, in the hollow fiber membrane modules 52 of the present invention the diameter of the collector pipes 21 can be reduced considerably, enabling a compact hollow fiber membrane module unit 62 to be constructed within the above size restrictions by layering a series of hollow fiber membrane modules.

In the hollow fiber membrane module unit 62 described above, the hollow fiber membrane modules 52 are positioned in parallel, the plurality of collector pipes 21 and the membrane surfaces of the hollow fiber membranes 23 are positioned vertically with respect to the water surface in the purification tank 70, and both tips of the collector pipes 21 on either side of the membrane are connected to the collector header 27. Each of the pipes of the collector pipes 21 connect through to the inside of the collector header 27.

The number of hollow fiber membrane modules 52 used will be determined by the degree of integration deemed necessary in the hollow fiber membrane module unit 62. For example, the standard displacement volume from filtration processing on a purification tank 70 for five family is 1 m$^3$/day. The membrane surface area of hollow fiber membrane required to achieve this amount of filtration processing will be 5 m$^3$ assuming the filtration processing capability of the hollow fiber membrane used is 0.2 m/day (m$^3$/m$^2$/day). Consequently, a plurality of hollow fiber membrane modules 52 are integrated into the hollow fiber membrane module unit 62 to ensure that the membrane surface area of the hollow fiber membranes 23 totals 5 m$^3$.

A suction port 28 for connecting to an external suction pump is provided in the central region of the collector header 27, on the opposite face from where the collector pipes 21 are connected. The suction port 28 is provided at least on the collector header 27 to which pipes from the collector pipes 21 are connected.

Furthermore, the support columns 29 are located at either end of the collector headers 27, at the four corners of the hollow fiber membrane module unit 62. The support columns 29 fix the collector headers 27 in place and also support the hollow fiber membrane module unit 62. Provision of the support columns 29 enables sufficient strength to be maintained in the hollow fiber membrane module unit 62.

Moreover, the plate shaped shield plates 20 which sit parallel to the hollow fiber membranes 23 are provided at both side of the hollow fiber membrane module unit 62, where the support columns 29 are located.

The shield plates 20 are provided so that during air scrubbing of the hollow fiber membrane module unit 62 the air does not leak outside of the hollow fiber membrane module unit 62, but hits the hollow fiber membranes 23 efficiently and in sufficient amounts to ensure that the cleaning progresses smoothly.

When a hollow fiber membrane module unit 62 is used for filtration processing, cleaning by air scrubbing is used to remove sludge adhered to the hollow fiber membranes 23 and improve the filtration rate. Conventionally, this type of cleaning has involved the dispersion of air bubbles from an air diffuser located at the bottom of the purification tank, where the rising of these air bubbles causes the hollow fiber membrane to oscillate. This oscillation causes the hollow fibers to rub against each other, and also causes the hollow fibers to move relative to the water, which removes the sludge adhered to the surface of the hollow fiber membrane. In this case, when a hollow fiber membrane module is attached to an air diffuser, alignment is conducted at the site where the system is to be used.

With the present invention, in order to negate the necessity for this operation, it is preferable that a diffuser tube is positioned in advance at a point below the hollow fiber membrane module unit 62. This removes the necessity of aligning the diffuser tube, and enables the hollow fiber membrane module unit 62 to be lowered through the manhole 71 and positioned easily in the purification tank 70.

Operation of the hollow fiber membrane module unit 62 involves connection of the hollow fiber membrane module unit 62, which is positioned inside the purification tank 70, to an external suction pump via the suction port 28 on the collector header 27, and then activating the suction pump to carry out suction filtration. Furthermore, suction filtration can also be conducted without using a suction pump, by connecting the suction port 28 to a location lower than the water level inside the purification tank 70 and using the difference in head pressure to provide the suction.

The water to be processed is filtered by the hollow fiber membranes 23 of the hollow fiber membrane module unit 62, and the filtrate then passes through the piping of the collector pipes 21, drains into the collector header 27, through the suction port 28 and is discharged to outside of the purification tank 70.

Furthermore, in order not to reduce the filtration processing rate of the hollow fiber membrane module unit 62 inside the purification tank 70, the air scrubbing cleaning process described above for removing sludge adhered to the hollow fiber membranes 23 of the hollow fiber membrane module unit 62 is carried out concurrently with the filtration process.

With a purification tank 70 of the present invention, because a hollow fiber membrane module unit 62 of a size which is compatible with the aforementioned FRP style purification tank is constructed and then positioned inside the tank, the filtration processing capability is high, and exchange and maintenance of the hollow fiber membrane module unit 62 can be conducted via the manhole 71, making the configuration very suitable as a filtration processing device for highly polluted water.

Figure 8:
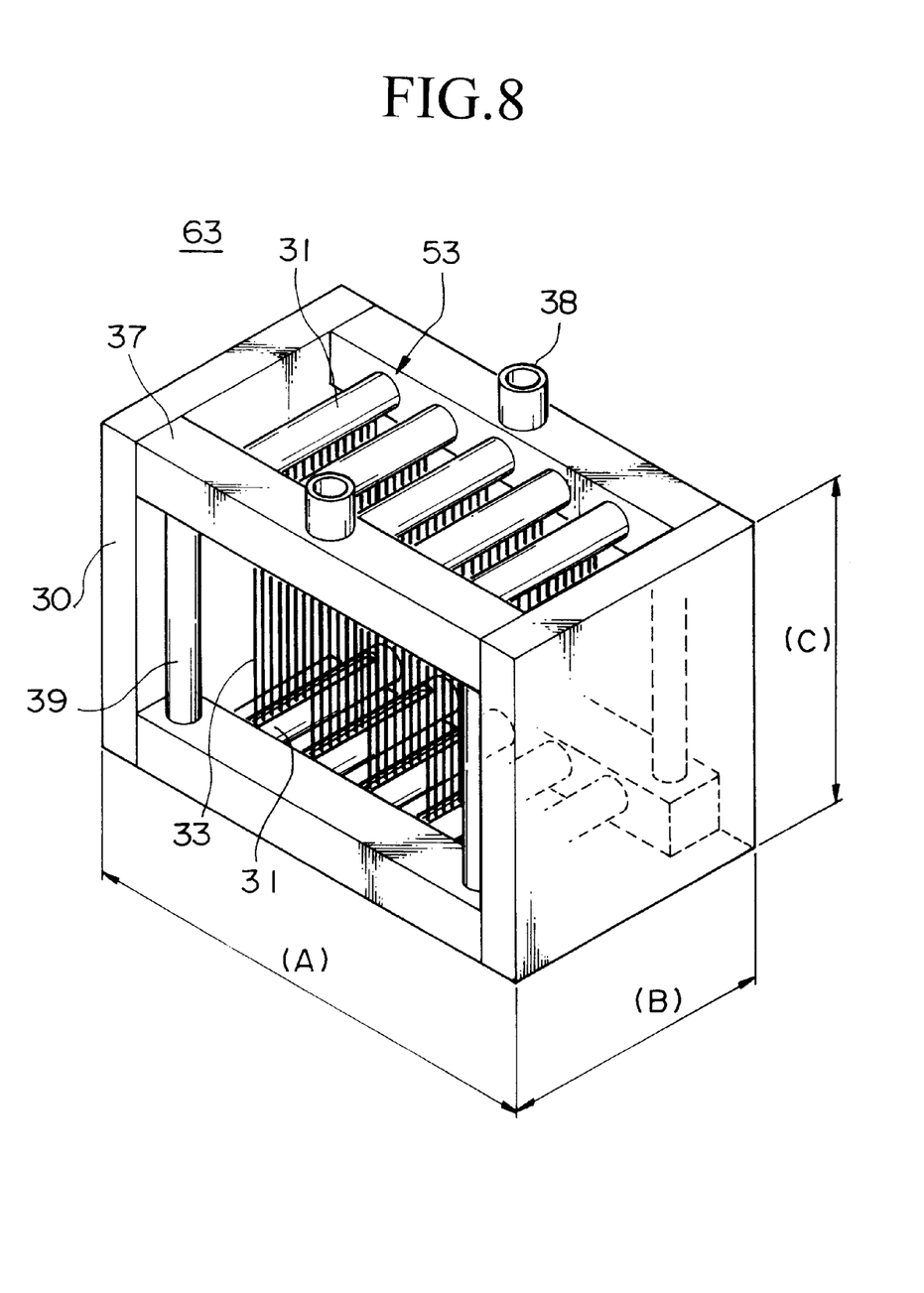

FIG. 8 shows another example of a hollow fiber membrane module unit, to be positioned inside a purification tank 70 of the present invention. A hollow fiber membrane module unit 63 comprises a plurality of hollow fiber membrane modules 53 and is positioned inside the purification tank so that the collector pipes 31 of the hollow fiber membrane modules 53 lie horizontally and the membrane surface of the hollow fiber membranes 33 are vertical in relation to the water surface. The hollow fiber membrane module unit 63 is a rectangular parallelepiped, the shape of which is maintained by collector headers 37, support columns 39 and shield plates 30. The construction members of the unit are the same as those shown in FIG. 7 for the hollow fiber membrane module unit 62.

The rectangular parallelepiped shaped hollow fiber membrane module unit 63 is constructed so that a length (A) of the unit along the direction of the hollow fiber membrane module 53 layering is within a range 20~500 mm, a length (B) of the unit in a direction along the length of the collector pipes 31 of the hollow fiber membrane modules 53 is within a range 100~500 mm, and a length (C) of the unit in a direction along the length of the hollow fiber membranes 33 of the hollow fiber membrane modules 53 is within a range 100~1500 mm.

The length (A) of the unit will be determined by the outside diameter of the collector pipes 31, the distance between adjacent collector pipes, the outside diameter of the support columns 39, the distance between a support column 39 and the adjacent collector pipe 31, the length of the collector header 37, and the thickness of the shield plates 30. The length (B) of the unit will be determined by the lengths of the collector pipes 31 and the support columns 39, and the outside dimension of the collector header 37. The height (C) of the unit will be determined by the distance between two opposing collector pipes 31 of the hollow fiber membrane module unit 63, that is, the length of the hollow fiber membrane 33. The overall size of the hollow fiber membrane module unit 63 will be determined by adjusting the three inter-related dimensions appropriately.

With the hollow fiber membrane module unit 63 described above, the collector header 37 is provided so that when the hollow fiber membrane module unit 63 is positioned inside a purification tank, the opening of the suction port 38 of the collector header 37 points upward.

Furthermore, the support columns 39 are located at either end of the collector headers 37, at the four corners of the hollow fiber membrane module unit 63.

Moreover, the shield plates 30 are provided at both side of the unit 63, in the same manner as for the hollow fiber membrane module unit 62.

The use of these support columns 39 and shield plates 30 enables miniaturization of the hollow fiber membrane module unit 63.

The method for positioning the hollow fiber membrane module unit 63 in a purification tank and the method for usage thereof is the same as that described above for the hollow fiber membrane module unit 62, with the exception that the direction in which the unit is positioned differs, and the effects which is the same as the hollow fiber membrane module unit 62 is obtained.

What is claimed:

1. A hollow fiber membrane module comprising:
   a collector pipe having an aperture;
   a hollow fiber membrane with hollow fibers deployed in a plane, the hollow fiber membrane extending through the aperture in the collector pipe such that an open ended tip of the hollow fiber membrane is positioned within an interior of the collector pipe; and
   a hardened fixing resin positioned within the aperture in the collecting pipe such that at least one end of the hollow fiber membrane is fixed to the collector pipe in a fluid tight manner, the fixing resin being positioned in the aperture without contacting the open ended tip of the hollow fiber membrane,
   wherein a weir is provided at a peripheral portion of the aperture of said collector pipe.

2. A hollow fiber membrane module comprising:
   a collector pipe having an aperture;
   a hollow fiber membrane with hollow fibers deployed in a plane, the hollow fiber membrane extending through the aperture in the collector pipe such that an open ended tip of the hollow fiber membrane is positioned within an interior of the collector pipe; and
   a hardened fixing resin positioned within the aperture in the collecting pipe such that at least one end of the hollow fiber membrane is fixed to the collector pipe in a fluid tight manner, the fixing resin being positioned in the aperture without extending substantially inside of the collector pipe and without contacting the open ended tip of the hollow fiber membrane.

3. A hollow fiber membrane module according to claim 2, wherein for said collector pipe, one with an outside diameter of 5~30 mm and a length of 30~2000 mm is used.

4. A hollow fiber membrane module according to claim 2, wherein for said fixing resin, one with an initial viscosity of 150~450 cPs is used.

5. A hollow fiber membrane module according to claim 2, wherein for said fixing resin, polyurethane resin is used.

6. A hollow fiber membrane module according to claim 2, wherein for said hollow fiber membrane, knitted fabric of hollow fibers is used.

7. A hollow fiber membrane module according to claim 2, wherein a membrane length of said hollow fiber membrane is in a range of 100~2000 mm.

8. A hollow fiber membrane module unit, wherein a plurality of the hollow fiber membrane modules according to claim 2 are positioned proximately and integrated together by connecting the collector pipe of each module to a collector header, such that filtered liquid inside a hollow fiber membrane passes through an internal passage inside the collector pipe and drains into the collector header.

9. A purification tank with a hollow fiber membrane module unit according to claim 8 disposed thereinside, wherein said hollow fiber membrane module unit is disposed inside said purification tank such that the collector pipes of the hollow fiber membrane modules and the membrane surface of the hollow fiber membranes are vertical in relation to the water surface, and the size of the hollow fiber membrane module unit is specified by a length (A) of the unit along the direction of the hollow fiber membrane module layering being within a range 20~500 mm, a length (B) of the unit in a direction along the length of the hollow fibers of the hollow fiber membrane modules being within a range 100~500 mm, and a length (C) of the unit in a direction along the length of the collector pipes of the hollow fiber membrane modules being within a range 100~1500 mm.

10. A purification tank according to claim 9, wherein a diffuser tube is secured integral with the hollow fiber membrane module unit disposed inside the tank.

11. A purification tank with a hollow fiber membrane module unit according to claim 8 disposed thereinside, wherein said hollow fiber membrane module unit is disposed inside said purification tank such that the collector pipes of the hollow fiber membrane modules lie horizontally, and the membrane surface of the hollow fibers are vertical in relation to the water surface, and the size of the disposed hollow fiber membrane module unit is specified by a length (A) of the unit along the direction of the hollow fiber membrane module layering being within a range 20~500 mm, a length (B) of the unit in a direction along the length of the collector pipes of the hollow fiber membrane modules being within a range 100~500 mm, and a length (C) of the unit in a direction along the length of the hollow fibers of the hollow fiber membrane modules being within a range 100~1500 mm.

12. A purification tank according to claim 11, wherein a diffuser tube is secured integral with the hollow fiber membrane module unit disposed inside the tank.

13. A hollow fiber membrane module unit, wherein a plurality of the hollow fiber membrane modules according to claim 2 are positioned proximately and integrated together by connecting the collector pipe of each module to a collector header and by means of a support column and a shield plate, such that filtered liquid inside a hollow fiber membrane passes through an internal passage inside the collector pipe and drains into the collector header.

14. A purification tank with a hollow fiber membrane module unit according to claim 13 disposed thereinside, wherein said hollow fiber membrane module unit is disposed inside said purification tank such that the collector pipes of the hollow fiber membrane modules and the membrane surface of the hollow fiber membranes are vertical in relation to the water surface, and the size of the hollow fiber membrane module unit is specified by a length (A) of the unit along the direction of the hollow fiber membrane module layering being within a range 20~500 mm, a length (B) of the unit in a direction along the length of the hollow fibers of the hollow fiber membrane modules being within a range 100~500 mm, and a length (C) of the unit in a direction along the length of the collector pipes of the hollow fiber membrane modules being within a range 100~1500 mm.

15. A purification tank according to claim 14, wherein a diffuser tube is secured integral with the hollow fiber membrane module unit disposed inside the tank.

16. A purification tank with a hollow fiber membrane module unit according to claim 13 disposed thereinside, wherein said hollow fiber membrane module unit is disposed inside said purification tank such that the collector pipes of the hollow fiber membrane modules lie horizontally, and the membrane surface of the hollow fibers are vertical in relation to the water surface, and the size of the disposed hollow fiber membrane module unit is specified by a length (A) of the unit along the direction of the hollow fiber membrane module layering being within a range 20~500 mm, a length (B) of the unit in a direction along the length of the collector pipes of the hollow fiber membrane modules being within a range 100~500 mm, and a length (C) of the unit in a direction along the length of the hollow fibers of the hollow fiber membrane modules being within a range 100~1500 mm.

17. A purification tank according to claim 16, wherein a diffuser tube is secured integral with the hollow fiber membrane module unit disposed inside the tank.

18. A method of manufacturing a hollow fiber membrane module comprising the steps of:

providing an aperture in a collector pipe;

inserting an open ended tip of a hollow fiber membrane into the aperture in the collector pipe, the hollow fiber membrane having hollow fibers deployed in a plane;

filling the aperture with fixing resin without contacting the open ended tip of the hollow fiber membrane; and allowing the fixing resin to harden thereby securing at least one end of the hollow fiber membrane to the collector pipe in a fluid tight manner.

19. The method according to claim 18, wherein a weir is provided at a peripheral portion of the aperture of the collector pipe.

20. The method according to claim 18, wherein a fixing resin with an initial viscosity of 150 to 450 cPs is used.

* * * * *